(12) United States Patent
Zudrell-Koch et al.

(10) Patent No.: US 6,577,079 B2
(45) Date of Patent: Jun. 10, 2003

(54) ELECTRONIC BALLAST WITH INTERMEDIATE CIRCUIT REGULATION

(75) Inventors: Stefan Zudrell-Koch, Dornbirn (AT); Günter Marent, Dornbirn (AT)

(73) Assignee: TridonicAtco GmbH & Co. KG, Dornbirn (AT)

( * ) Notice: Subject to any disclaimer, the term of this patent is extended or adjusted under 35 U.S.C. 154(b) by 0 days.

(21) Appl. No.: 09/951,615

(22) Filed: Sep. 14, 2001

(65) Prior Publication Data

US 2002/0047607 A1 Apr. 25, 2002

(30) Foreign Application Priority Data

Sep. 15, 2000 (DE) .......................................... 100 45 713
Jun. 13, 2001 (DE) .......................................... 101 28 588

(51) Int. Cl.[7] .................................................. G05F 1/00
(52) U.S. Cl. ..................... 315/308; 315/225; 315/224; 315/291; 315/127
(58) Field of Search ................................ 315/224, 225, 315/219, 291, 307, 308, 121, 127, DIG. 7, 209 R, 244

(56) References Cited

U.S. PATENT DOCUMENTS

| 5,612,597 A | * | 3/1997 | Wood ...................... 315/209 R |
| 5,623,187 A | * | 4/1997 | Caldeira et al. ........ 315/209 R |
| 5,636,111 A | * | 6/1997 | Griffin et al. ................ 315/225 |
| 5,677,602 A | * | 10/1997 | Paul et al. ................... 315/224 |
| 6,400,095 B1 | * | 6/2002 | Primisser et al. ........... 315/121 |

FOREIGN PATENT DOCUMENTS

| WO | WO 99/34647 | 7/1999 |
| WO | WO 99/34650 | 7/1999 |

* cited by examiner

Primary Examiner—Haissa Philogene
(74) Attorney, Agent, or Firm—Fitzpatrick, Cella, Harper & Scinto

(57) ABSTRACT

An electronic ballast for at least one gas discharge lamp (LA) comprises a rectifier circuit (2) connectable to an a.c. voltage source ($U_0$), a smoothing circuit (3), connected to the output of the rectifier circuit (2), for generating an intermediate circuit voltage ($U_z$), and an inverter (4) fed with the intermediate circuit voltage ($U_z$), at the output of which inverter a connection for the load circuit (5) containing the lamp (LA) is connected. The smoothing circuit (3) is constituted by a switching regulator and the ballast further has a control circuit (6) which detects the intermediate circuit voltage ($U_z$) and controls a controllable switch (S1) of the switching regulator in dependence upon the value of the intermediate circuit voltage ($U_z$). In order to suppress the occurrence of harmonics and disruptive frequencies the control circuit (6) further detects an input voltage ($U_i$) of the smoothing circuit (3) and extends the on-state times for the controllable switch (S1) when the input voltage ($U_i$) approaches its minimal value.

11 Claims, 1 Drawing Sheet

ELECTRONIC BALLAST WITH INTERMEDIATE CIRCUIT REGULATION

BACKGROUND OF THE INVENTION

1. Field of the Invention

The present invention relates to an electronic ballast for the operation of a gas discharge lamp.

2. Description of the Related Art

The employment of electronic ballasts for the operation of gas discharge lamps leads to significant energy savings due to reduced ballast losses and improved lamp efficiency. The input of an electronic ballast usually constitutes a high frequency filter connected to the voltage supply network, which filter is connected with a rectifier circuit. The rectified supply voltage from the rectifier circuit is delivered to a smoothing circuit for generating an intermediate circuit voltage, an inverter fed with the intermediate circuit voltage then generates a high frequency a.c. voltage, which is applied to the load circuit with the gas discharge lamp arranged therein. The operation of the lamp with the high frequency a.c. voltage leads to a reduction of electrode losses and to an increase of the light yields in the positive column of the lamp.

The purpose of the smoothing circuit consists primarily in making available the power necessary for the operation of the lamp. In an electronic ballast described in WO 99/34647 A1 a step-up converter is used as smoothing circuit, the controllable switch of which step-up converter is controlled by a control circuit, for regulating the intermediate circuit voltage. Regulation is necessary since the output power of the ballast changes, which automatically affects the intermediate circuit voltage.

A further purpose of the smoothing circuit is to avoid as far as possible that disrupting frequencies arise which could be reflected back into the supply network. Such disrupting frequencies arise for example when phase differences appear between the applied voltage and the current. The regulation is thus effected in the ideal case such that the current is as sinusoidal as possible and has no phase displacement with respect to the voltage.

The above-described step-up converter has, however, the characteristic that before a zero-crossing of the received voltage the current flow suddenly jumps to zero and only resumes after the zero-crossing with a certain time delay. The reason for this is found in the switching capacitances lying above the control switch of the step-up converter. The sudden drop of current to zero is disadvantageous since in this period of time current and voltage are out of phase, which—as described above—leads to the undesired harmonics and disruptions. This problem occurs in general with the employment of switching regulators.

SUMMARY OF THE INVENTION

It is thus the object of the present invention to provide an electronic ballast which has a further improved limiting of harmonics.

This object is achieved by means of a novel electronic ballast which contains a rectifier circuit connectable to an a.c. voltage source, a smoothing circuit, connected to the output of the rectifier circuit, for generating an intermediate circuit voltage, and an inverter fed with the intermediate circuit voltage, at the output of which inverter a connection for the load circuit containing the lamp is connected. The smoothing circuit is formed by a switching regulator the controllable switch of which is controlled by a control circuit. For this purpose, the control circuit detects the intermediate circuit voltage and generates in dependence thereupon a control signal for the switch.

In accordance with the invention the control circuit is so constituted that it additionally detects the input voltage of the smoothing circuit and extends the on-state times for the controllable switch when the input voltage approaches its minimum value.

The basic insight of the present invention thus lies in that the on-state times of the switch are extended in dependence upon the actual value of the input voltage. It has proved that through this measure the rapid fall-off of the current, and thus the occurrence of harmonics and disrupting frequencies, can be avoided.

Further developments of the invention are described hereinafter.

Thus, an advantageous configuration of the invention consists in that the extension of the on-state times is greater, the lesser is the input voltage. In order to achieve this in a simple manner, a particularly advantageous development of the ballast in accordance with the invention consists in that the control circuit works in a digital manner. For this purpose, the control circuit has an analog-digital converter which converts the detected intermediate circuit voltage and the input voltage into two digital values with a precision of at least two bits—preferably of twelve bits. Within the control circuit there is then provided a digital regulation circuit which on the basis of the two digital values calculates switching information for the operation of the switch and passes this on to a driver circuit which in turn converts this switching information into corresponding control signals.

The advantage of this digital constitution of the control circuit consists in that the influence of the various operational parameters for the control of the switch can be taken into account significantly more simply than would be the case with a purely analog circuit. For this purpose it can be provided that the control circuit has a memory with a comparison table in which to each value of the input voltage there is allocated a particular time interval by which the on-state time for the controllable switch is extended. Additionally it is to be noted that a conversion of the measured operational parameters into digital values with a precision of at least two bits is definitely required, since for example in the case of a "quasi digital" regulation by means of a simple comparison of operational values with reference values a sufficiently high precision could not be obtained, and therewith in the end also stability for the intermediate circuit voltage could not be attained. In contrast thereto, with the digital regulation in accordance with the invention, a very high stability can be attained, and on the other hand a digital circuit occupies only little space so that the ballast can be made more compact overall.

A further development of the invention consists in that the control circuit in accordance with the invention is employed further also for the control of the inverter and therewith for the operation of the lamp. For this purpose there may be provided a further analog-digital converter which transforms an operational parameter of the load circuit into a digital value, whereby the control circuit calculates switching information for the operation of the inverter on the basis of this digital value. As operational parameter there may be detected for example the lamp voltage and/or the lamp current.

BRIEF DESCRIPTION OF THE DRAWING

In the following, the invention will be explained with reference to the accompanying drawing, which illustrates a ballast in accordance with the invention.

DETAILED DESCRIPTION OF THE PREFERRED EMBODIMENT

Figure 1:
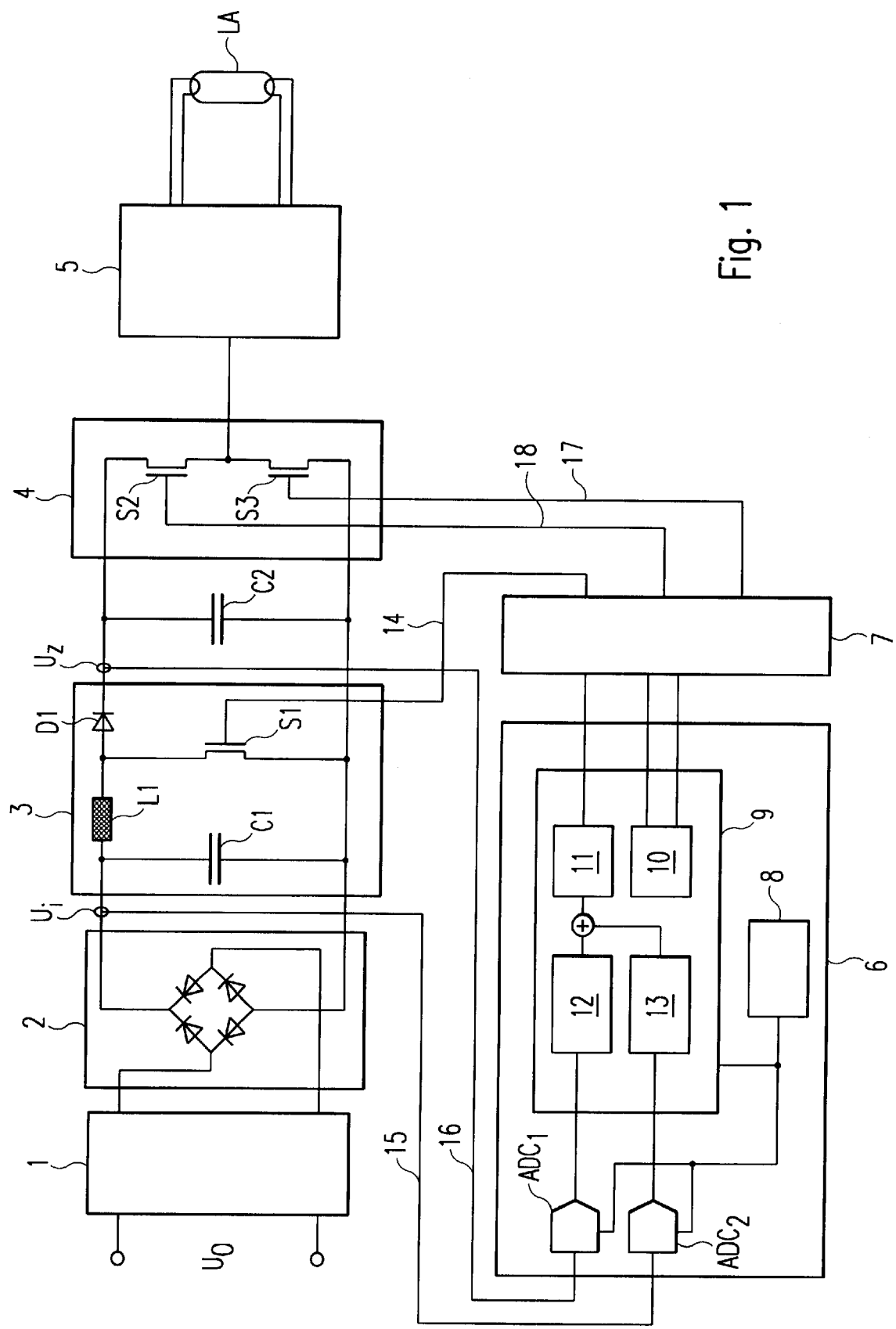

The ballast illustrated in the single FIG. 1 is connected on the input side to a network supply voltage $U_0$ via a high frequency filter 1. The output of the high frequency filter 1 is connected with a rectifier circuit 2 in the form of a full-bridge rectifier.

The supply a.c. voltage rectified by the rectifier circuit 2 is also the input voltage $U_i$ for the smoothing circuit 3. In the present example this is formed by a smoothing capacitance C1 and a step-up converter having an inductance L1, a controllable switch in the form of a MOS field effect transistor S1, and a diode D1. Instead of the step-up converter, other switching regulators could also be employed.

By means of an appropriate switching of the MOS field effect transistor S1 there is generated in known manner an intermediate circuit voltage $U_z$ supplied via the storage capacitance C2 arranged thereafter, which intermediate circuit voltage is delivered to the inverter 4. The inverter 4 is constituted by two further MOS field effect transistors S2 and S3 arranged in a half-bridge configuration. By means of a high frequency clocking of these two switches S2 and S3 a high frequency a.c. voltage is generated at their middle tap, which voltage is delivered to the load circuit 5 with the gas discharge lamp LA connected thereto.

The functioning of the step-up converter is in principle already known and is thus merely briefly summarized in the following. If the field effect transistor S1 is conducting, the current in the inductance L1 increases linearly. If, on the other hand, the field effect transistor S1 is blocked, the current is discharged into the storage capacitor C2. By means of a purposive control of the switch S1 the energy take-up of the step-up converter, and therewith also the intermediate circuit voltage $U_z$ applied to the storage capacitor C2, can be influenced.

The control of the switch S1 of the step-up converter is effected by means of a control circuit 6 which generates appropriate switching information and passes this on to a driver circuit 7 connected to the control circuit 6. This converts the switching information into corresponding control signals and controls the gate of the field effect transistor S1 via the line 14. In the same manner, signals are generated by the control circuit 6 and the driver circuit 7 for controlling the two field effect transistors S2 and S3 of the inverter 4. All components of the control unit 6 are synchronized via a central clock unit 8 which provides them with appropriate clock signals. The control unit 6 is constituted as an application specific integrated circuit (ASIC) and thus occupies only little space.

The calculation of the switching information for the switch S1 of the step-up converter is effected by means of a digital regulation circuit 9 arranged within the control circuit 6. For this purpose, the control circuit has two analog-digital converters $ADC_1$ and $ADC_2$, which convert the input voltage $U_i$ delivered via the input line 15, and the intermediate circuit voltage $U_z$ delivered via the input line 16, into digital values.

These digital values have a precision of at least two bits, preferably of twelve bits. These digital values are both delivered to the regulation circuit 9, the value of the intermediate circuit voltage $U_z$ to a first calculation block 12 and the value of the input voltage $U_1$ to a switching time extension block 13. Preferably, the two analog-digital converters $ADC_1$ and $ADC_2$ are formed by means of a single analog-digital converter which works in a time-multiplex manner.

The calculation block 12 serves for calculating a suitable on-state period for the switch S1 on the basis of the actual value of the intermediate circuit voltage $U_z$. However, before a control signal for the switch S1 is generated on the basis of the on-state period determined by the calculation block 12, the on-state period is supplemented by an additional value which is determined by the switching time extension block 13. For this purpose, the switching time extension block 13 has a memory with a table which allocates to each value of the input voltage $U_i$ a particular time interval by which the on-state time of the switch S1 is extended. The value of this additional interval is added to the on-state period calculated by the calculation block 12 and passed on to an output block 11. This generates appropriate switching information which is delivered to the driver circuit 7, which then sends a corresponding control signal via the line 14 to the gate of the transistor S1.

The information stored in the memory of the switching time extension block 13 may for example be empirically determined in trials. Alternatively thereto, there is however the possibility of calculating the on-state time extension in accordance with a particular function. In the most general sense, the relationship between the on-state time extension and the input voltage consists in that the on-state time extension is greater, the lower is the input voltage $U_i$. Further it can be provided that above a certain value, no extension of the on-state time is effected.

Additionally it is to be remarked that the control circuit 6 is also employed for the operation of the two switches S2 and S3 of the inverter 4. For this purpose there may be provided one or more non-illustrated analog-digital converters which convert the operational parameters taken from the load circuit 5 into digital values and deliver them to the digital regulation circuit 9. There is illustrated a regulation block 10 which, in dependence upon the input signals, calculates control information for the switches S2 and S3 and passes this on to the driver circuit 7. The driver circuit 7 generates in turn corresponding control signals and transfers these via the line 17 and 18 to the gates of the two field effect transistors S2 and S3 of the inverter 4.

The advantage of this digital configuration of the control circuit consists in that by these means the regulation characteristics can be kept very flexible and the various influences of the operational parameters can be taken into account in a simple manner. Furthermore, the digital configuration offers a saving in terms of space, so that the ballast in accordance with the invention can in terms of its dimensions overall be kept extremely compact. This is in particular the case when the control circuit 6 is constituted as an application specific integrated circuit (ASIC). Through the extension of the on-state time of the switch of the step-up converter at low input voltages there can be further achieved a significant reduction of the occurrence of harmonics.

What is claimed is:

1. Electronic ballast for at least one gas discharge lamp, having a rectifier circuit connectable to an a.c. voltage source, a smoothing circuit, connected to the output of the rectifier circuit, for generating an intermediate circuit voltage, and an inverter fed with the intermediate circuit voltage, at the output of which inverter a connection for a load circuit containing the lamp is connected, the smoothing circuit being constituted by a switching regulator and a controllable switch arranged such that when said switch is conducting, the output current of said smoothing circuit increases linearly and when said switch is blocked the current is discharged into a storage capacitor, the ballast further having a control circuit which detects the intermediate circuit voltage and controls said controllable switch in dependence upon the value of the intermediate circuit voltage, said control circuit being constructed and arranged to detect an input voltage of the smoothing circuit and being operative to extend the on-state times for the controllable switch in response to the input voltage approaching its minimal value.

2. Electronic ballast according to claim 1, wherein the extension of the on-state times is greater when the input voltage is lower.

3. Electronic ballast according to claim 1, wherein the control circuit has two analog-digital converters for converting the intermediate circuit voltage and the input voltage into two digital values each consisting of at least two bits, the control circuit including a digital regulation circuit for calculating, on the basis of digital values from said analog-digital converters, switching information for operation of the controllable switch of the switching regulator, said control circuit being operative to pass the switching information to a driver circuit which converts this switching information into a corresponding control signal for controlling the switch.

4. Electronic ballast according to claim 3, wherein the control circuit includes a memory in which a particular time interval is allocated to each value of the input voltage, by which time interval the on-state times for the controllable switch are extended.

5. Electronic ballast according to claim 3, wherein the control circuit is constructed and arranged to additionally detect at least one operational parameter of the load circuit, said control circuit including a further analog-digital converter for converting this operational parameter into a digital value consisting of at least two bits, said control circuit further including a digital regulation circuit for calculating, on the basis of said digital value, switching information for operation of the inverter and for passing said switching information on to said driver circuit said driver circuit being constructed to convert said switching information into a corresponding control signal for controlling said inverter.

6. Electronic ballast according to claim 5, wherein the control circuit is configured to detect the lamp voltage.

7. Electronic ballast according to claim 5, wherein the control circuit is configured to detect the lamp current.

8. Electronic ballast according to claim 3, wherein the control circuit includes a clock unit which supplies a clock signal to components of said control circuit.

9. Electronic ballast according to claim 1, wherein said control circuit is an application specific integrated circuit.

10. Electronic ballast according to claim 3, wherein digital values generated by said analog-digital converters have a precision of twelve bits.

11. Electronic ballast according to claim 1, wherein the smoothing circuit comprises a step-up converter.

* * * * *